United States Patent
Belz et al.

(10) Patent No.: US 8,356,091 B2
(45) Date of Patent: Jan. 15, 2013

(54) APPARATUS AND METHOD FOR MANAGING A NETWORK

(75) Inventors: Steven Belz, Austin, TX (US); Kurt Joseph, Austin, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1155 days.

(21) Appl. No.: 11/854,092

(22) Filed: Sep. 12, 2007

(65) Prior Publication Data

US 2009/0067591 A1   Mar. 12, 2009

(51) Int. Cl.
*G06F 15/177* (2006.01)
(52) U.S. Cl. .................... 709/223; 709/220
(58) Field of Classification Search ........... 709/223–226
See application file for complete search history.

(56) References Cited

U.S. PATENT DOCUMENTS

| | | |
|---|---|---|
| 2005/0032506 A1 | 2/2005 | Walker |
| 2005/0057359 A1 * | 3/2005 | Coffey et al. ............ 340/539.21 |
| 2005/0198221 A1 * | 9/2005 | Manchester et al. .......... 709/220 |
| 2006/0145883 A1 * | 7/2006 | Fong et al. ................. 340/686.6 |
| 2007/0106764 A1 | 5/2007 | Mansfield |

FOREIGN PATENT DOCUMENTS

JP   EP1566726   *   8/2005

* cited by examiner

*Primary Examiner* — Ian N Moore
*Assistant Examiner* — Thai Nguyen
(74) *Attorney, Agent, or Firm* — Guntin & Gust, PLC; Andrew Gust (57) ABSTRACT

A system that incorporates teachings of the present disclosure may include, for example, a network element having a controller to obtain network information associated with establishing a network among a group of communication devices, and provide the network information to a plurality of network set-up devices removably connected to the network element, where each of the plurality of network set-up devices is connectable with a communication device of the group of communication devices to provide at least a portion of the network information to the communication device, and where the network is established based at least in part on the at least a portion of the network information. Other embodiments are disclosed.

19 Claims, 5 Drawing Sheets

APPARATUS AND METHOD FOR MANAGING A NETWORK

FIELD OF THE DISCLOSURE

The present disclosure relates generally to communication services and more specifically to an apparatus and method for managing a network.

BACKGROUND

It is often desirable to connect several co-located users via a local area network in order to enable the sharing of information. In some instances, this can be achieved through providing internet access and having individuals share information via email. However, adding new users to a network can be a tedious process that requires time-consuming configuration of the communication devices. Additionally, network operators often want to add the new users without exposing the rest of their network or by providing only limited access to those new users.

DETAILED DESCRIPTION

In one embodiment of the present disclosure, a computer-readable storage medium can have computer instructions for obtaining network information associated with establishing a network among a group of communication devices, storing the network information on a base unit, and providing the network information to a plurality of network set-up devices removably connected to the base unit, where each of the plurality of network set-up devices is connectable with a communication device of the group of communication devices to provide at least a portion of the network information to the communication device, and where the network is established based at least in part on the supplied portion of the network information.

In one embodiment of the present disclosure, a network element can have a controller to obtain network information associated with providing a communication device with access to a network, store the network information, provide the network information to a network set-up device removably connected to the network element, and monitor a distance of the network set-up device from the network element, where the network set-up device is connectable with the communication device to provide at least a portion of the network information to the communication device, and where the access to the network is provided based at least in part on the supplied portions of the network information.

In one embodiment of the present disclosure, a network element can have a controller to obtain network information associated with establishing a network among a group of communication devices, and provide the network information to a plurality of network set-up devices removably connected to the network element, wherein each of the plurality of network set-up devices is connectable with a communication device of the group of communication devices to provide at least a portion of the network information to the communication device, and wherein the network is established based at least in part on the supplied portions of the network information.

In one embodiment of the present disclosure, a network element can have a controller to receive network information from a base unit where the network information is associated with providing a communication device with access to a network and where the network element is removably connected to the base unit when receiving the network information, store the network information, provide at least a portion of the network information to the communication device where the network element is removably connected to the communication device when providing the portion of the network information, and transmit a signal to the base unit where the base unit uses the signal to monitor a distance of the network element and where the access to the network is provided based at least in part on the supplied portion of the network information.

In one embodiment of the present disclosure, a method can involve providing network information to a base unit where the network information is associated with establishing a network among a group of communication devices, providing the network information from the base unit to a plurality of network set-up devices removably connected to the base unit, removing one or more of the plurality of network set-up devices from the base unit, connecting each of the one or more of the plurality of network set-up devices to a communication device of the group of communication devices, providing at least a portion of the network information to the communication device, and providing the communication device with access to the network based at least in part on the supplied portions of the network information.

Figure 1:
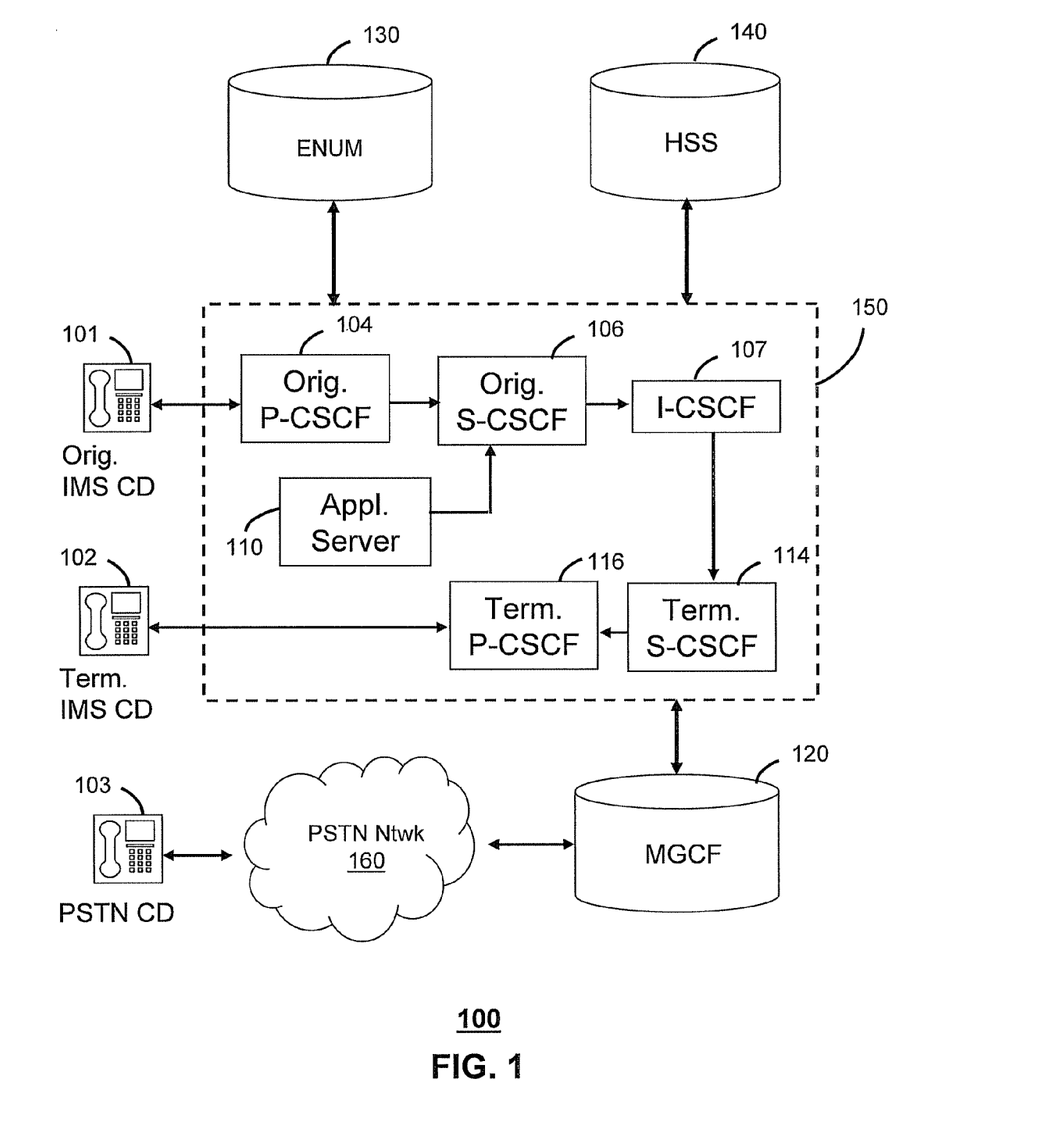
FIGS. 1-3 depict exemplary embodiments of communication systems.

FIG. 1 depicts an exemplary embodiment of a communication system 100 employing a IP Multimedia Subsystem (IMS) network architecture. The communication system 100 can comprise a Home Subscriber Server (HSS) 140, a tElephone NUmber Mapping (ENUM) server 130, and network elements of an IMS network 150. The IMS network 150 can be coupled to IMS compliant communication devices (CD) 101, 102 (e.g., set top boxes) or a Public Switched Telephone Network (PSTN) CD 103 using a Media Gateway Control Function (MGCF) 120 that connects the call through a common PSTN network 160. CDs 101-103 can be fixed, mobile, wireless and/or wired devices.

IMS CDs 101, 102 can register with the IMS network 150 by contacting a Proxy Call Session Control Function (P-CSCF) which communicates with a corresponding Serving CSCF (S-CSCF) to register the CDs with an Authentication, Authorization and Accounting (AAA) support by the HSS 140. To accomplish a communication session between CDs, an originating IMS CD 101 can submit a SIP INVITE message to an originating P-CSCF 104 which communicates with a corresponding originating S-CSCF 106. The originating S-CSCF 106 can submit the SIP INVITE message to an application server (AS) such as reference 110 that can provide a variety of services to IMS subscribers. For example, the application server 110 can be used to perform originating treatment functions on the calling party number received by the originating S-CSCF 106 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 106 can submit queries to the ENUM system 130 to translate an E.164 telephone number to a SIP Uniform Resource Identifier (URI) if the targeted communication device is IMS compliant. If the targeted communication device is a PSTN device, the ENUM system 130 will respond with an unsuccessful address resolution and the S-CSCF 106 will forward the call to the MGCF 120 via a Breakout Gateway Control Function (not shown).

When the ENUM server 130 returns a SIP URI, the SIP URI is used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE to the terminating S-CSCF 114 which can call on an application server similar to reference 110 to perform the originating treatment telephony functions described earlier. The terminating S-CSCF 114 can then identify a terminating P-CSCF 116 associated with the terminating CD 102. The P-CSCF 116 then signals the CD 102 to establish communications. The aforementioned process is symmetrical. Accordingly, the terms "originating" and "terminating" in FIG. 1 can be interchanged.

Figure 2:
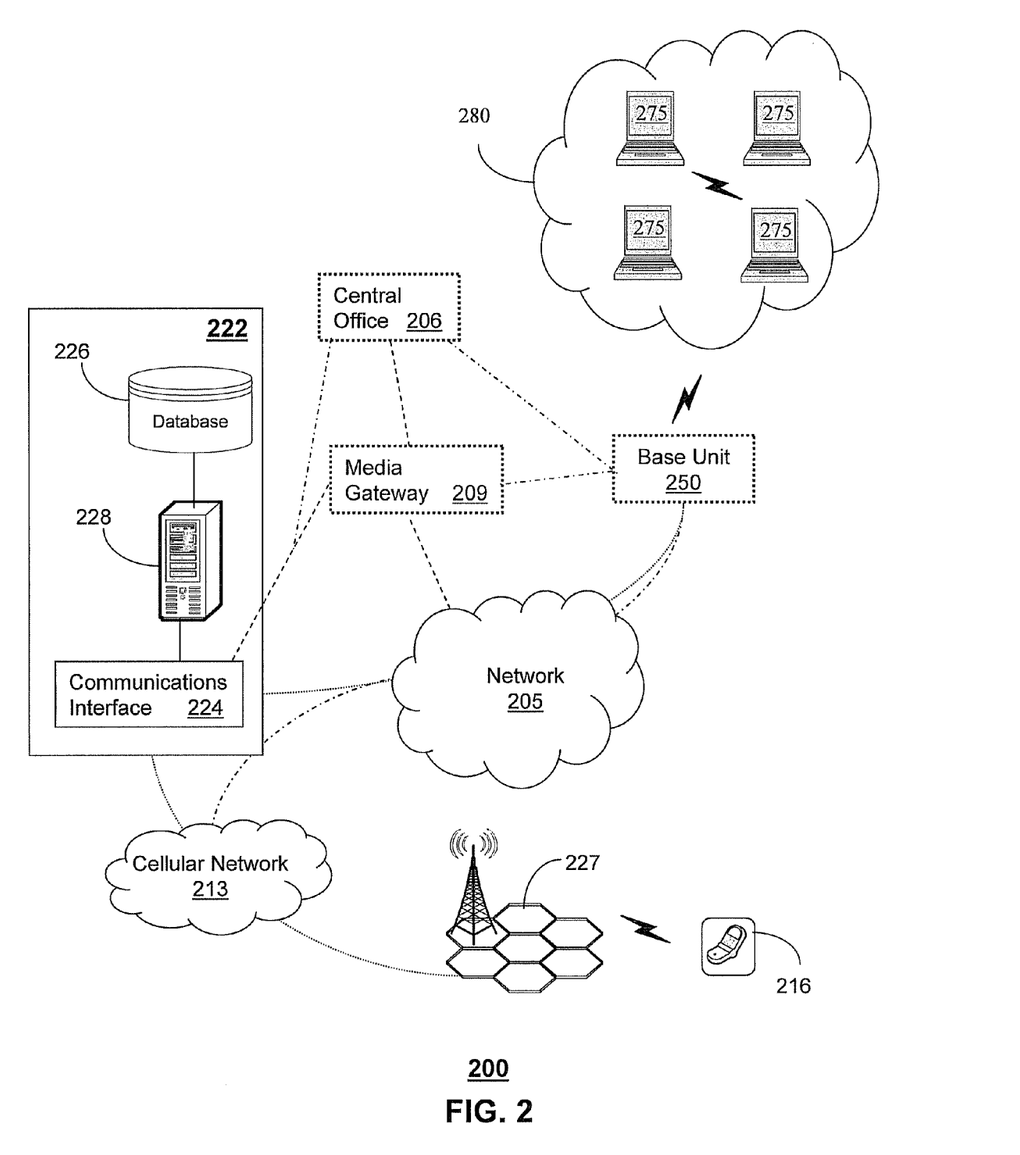

FIG. 2 depicts an exemplary embodiment of a communication system 200 employing communication devices 275 communicating by way of wireless access points (WAPs) and/or wired infrastructure with each other and/or other communication devices and/or a network proxy or web server 222, which collectively operate in the communication system 200. Communication system 200 can be overlaid or operably coupled with communication systems 100 as another representative embodiment of the communication system.

The communication devices 275 can be multimedia devices for communicating video, voice and/or data, such as a lap top computer. The communication devices 275 can be multimode communication devices that can communicate via a number of modes of communication, including wired and/or wireless communication, and can utilize a base unit or network element 250 to accomplish some or all of the communication. In one embodiment, the base unit 250 can be a hub. In another embodiment, the base unit 250 can have a network attached storage device, webserver, or other network technology that can make a network available to the communication devices 275 upon operable connection therewith. The base unit 250 can include various components, such as a controller, communications interface and memory, and can utilize various protocols for communication with the communication devices 275, as well as with other communication or network devices of the communication system 200. In one embodiment, the communication devices 275 can be part of a temporary ad hoc network 280 utilizing the base unit 250.

The communication system 200 can comprise a packet-switched network 205. The packet-switched network can be an Internet Service Provider (ISP) network 205. The network 205 can be coupled to the network proxy 222, the cellular network 213 and network elements throughout the communication system. 200. The ISP network 205 utilizes technology for transporting Internet traffic.

The network proxy 222 can be used to control operations of a media gateway 209, the central office 206 and other network elements of the communication system 200. Communications between the network proxy 222, the base unit 250, the communication devices 275, and other network elements of the communication system 200 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 222 can comprise a communications interface 224 that utilizes common technology for communicating over an IP interface with the network 205, the media gateway 209, and/or the cellular network 213. By way of the communications interface 224, the network proxy 222 can direct by common means any of the foregoing network elements to establish packet switched data, voice, and/or video connections between communication devices, including base unit 250 and devices 275, distributed throughout the communication system 200. The network proxy 222 can further comprise a memory 226 (such as a high capacity storage medium) embodied in this illustration as a database, and a controller 228 that makes use of computing technology such as a desktop computer, or scalable server for controlling operations of the network proxy 222. The network proxy 222 can operate as an IP Multimedia Subsystem (IMS) conforming in part to protocols defined by standards bodies such as 3GPP (Third Generation Partnership Protocol).

Under the control of the network proxy 222, the media gateway 209 can link packet-switched and circuit-switched technologies such as the cellular network 213 (or central office 206) and the network 205, such as an ISP network. The media gateway 209 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 200. The media gateway 209 can therefore support hybrid communication environments for the communication devices 275, including VoIP terminals.

The central office 206 can house common network switching equipment for distributing local and long-distance telecommunication services supplied by network 205. Telecommunication services of the central office 206 can include traditional POTS (Plain Old Telephone Service) and broadband services such as HDTV, DSL, VoIP (Voice over Internet Protocol), IPTV (Internet Protocol Television), Internet services, and so on. The communication system 200 can utilize common computing and communications technologies to support circuit-switched and/or packet-switched communications.

The cellular network 213 can support voice and data services over a number of access technologies such as GSM-GPRS, EDGE, CDMA-1X, UMTS, WiMAX, software defined radio (SDR), and other known and future technologies. The cellular network 213 can be coupled to base stations 227 under a frequency-reuse plan for communicating over-the-air with other communication devices of the communication system, including mobile devices 216 and communication devices 275.

Figure 3:
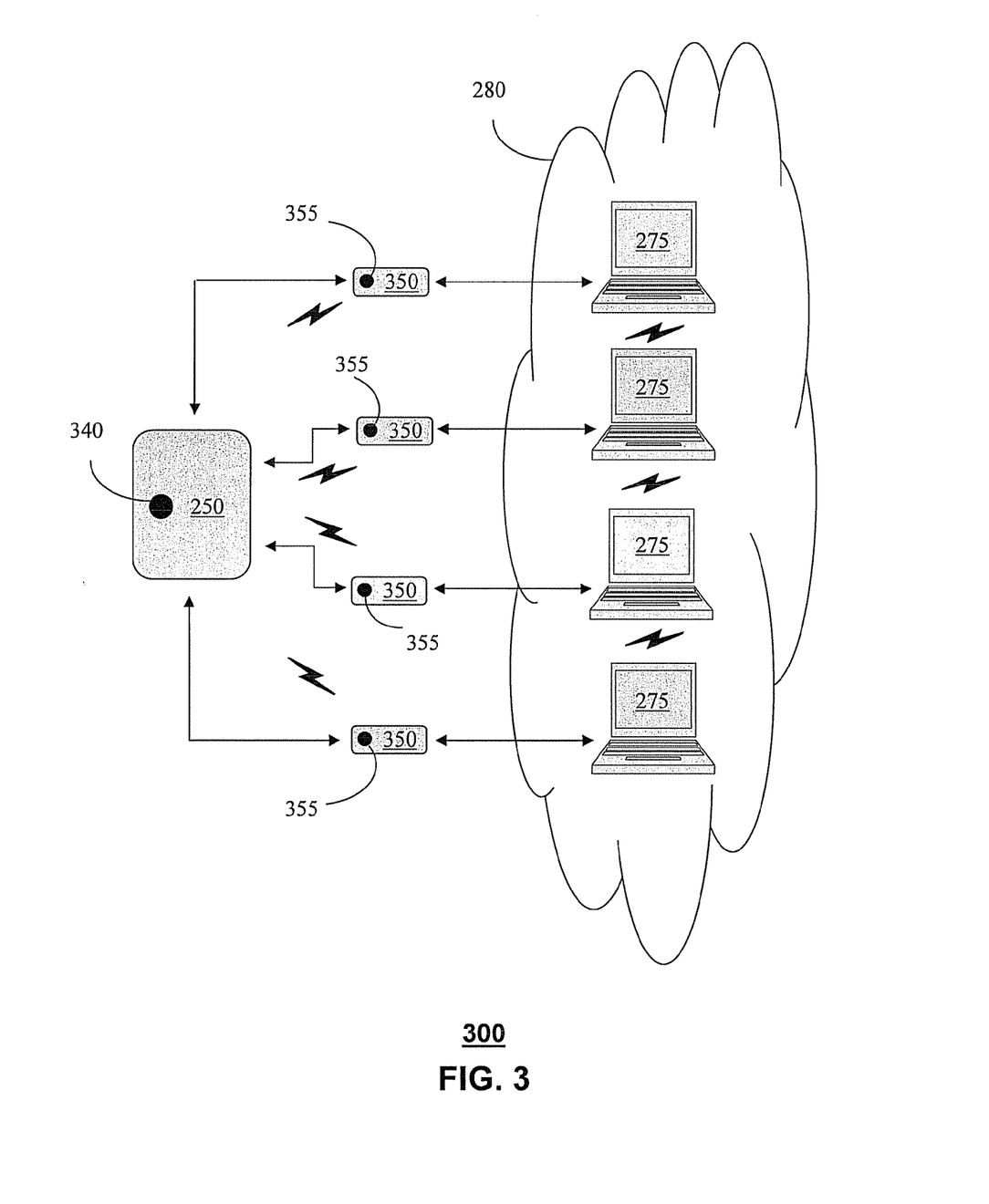

FIG. 3 depicts an exemplary embodiment of a communication system 300 employing communication devices 275 communicating by way of wireless access points (WAPs) and/or wired infrastructure with each other in the network 280, and/or communicating with other communication devices, through use of the base unit 250. Communication system 200 can be overlaid or operably coupled with communication systems 100 as another representative embodiment of the communication system. The network 280 can be a sub-network of a larger existing network, including a virtual private network.

The base unit 250 can include a network actuator 340 that upon depression or other actuation retrieves or otherwise accesses information associated with a temporary network to be established, including network access information, set-up parameters, and encryption keys. A plurality of network set-up devices 350 can be operably and removably connected to the base unit 250. The particular number of devices 350 can vary depending on a number of factors, including the intended size of the temporary network and whether sharing of the network set-up devices is permitted. In one embodiment, a single network set-up device 350 can be used and shared amongst a number of communication devices 275.

The base unit 250 can populate each of the network set-up devices 350 with the temporary network information. For example, the network set-up devices 350 can be USB flash memory devices or dongles having sufficient memory to store the temporary network information. As another example, the network set-up devices 350 can be sub-processors that are removably connectable to the base unit 250 and which can process some or all of the temporary network information (e.g., processing encryption algorithms), as well as store the temporary network information downloaded from the base unit.

The network set-up devices 350 can then provide the temporary network information or portions thereof to each of the communication devices 275. For example, USB flash memory devices can be connected to each of the USB ports of the communication devices 275 (e.g., lap top computers) for providing the temporary network information thereto. Once the temporary network information or portions thereof is provided to each of the communication devices 275 then the temporary network 280 can be established. In one embodiment, each of the network set-up devices 350 can retain some or all of the temporary network information so that a communication device 275 loses the network connection upon disconnect of the network set-up device.

In one embodiment, the base unit 250 and the network set-up devices 350 can have components and technology for tracking or otherwise range-finding each of the network set-up devices with respect to the base unit. For example, the base unit 250 can determine a range or distance of the device 350 based upon a transmitted signal (e.g., signal receipt time, strength of signal, and so forth). The signal can be based on a mode of wireless communication that the communication devices 275 utilize to communicate within the temporary network. In another embodiment, a transmitter 355 can be incorporated into the network set-up device 350 which utilizes a second mode of communication, such as an RF signal being emitted by an RF transmitter incorporated into the network set-up device. An alarm or other notification can be incorporated into one or both of the base unit 250 and the network set-up devices 350 to notify a user that the network set-up device is moving out of range.

Figure 4:
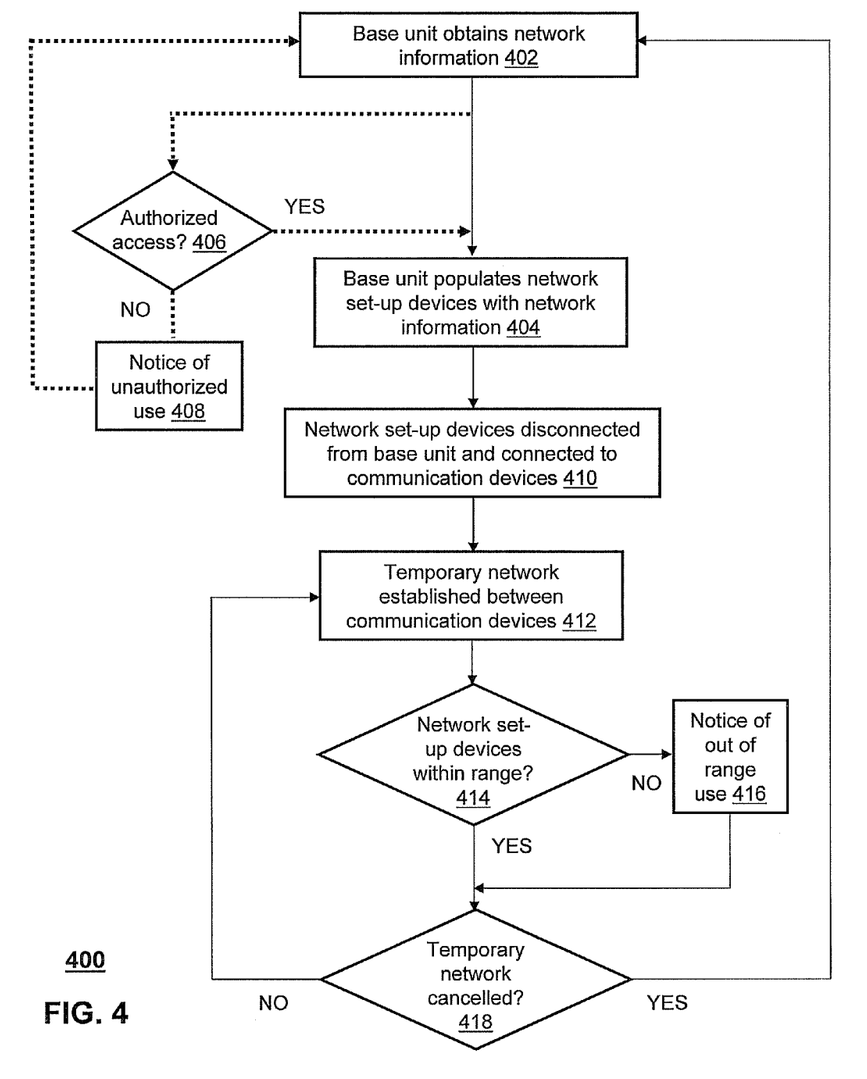
FIG. 4 depicts an exemplary method operating in portions of the communication systems.

FIG. 4 depicts an exemplary method 400 operating in portions of the communication systems 100-300. Method 400 has variants as depicted by the dashed lines. It would be apparent to an artisan with ordinary skill in the art that other embodiments not depicted in FIG. 4 are possible without departing from the scope of the claims described below. For convenience, reference to one or more features of communication system 300 as used in the following paragraphs can mean one or more features of the communication systems 100, 200, and 300 singly or in combination.

Method 400 begins with step 402 in which the base unit 250 can obtain network information, such as from network proxy 222, for establishing a temporary network among a group of communication devices 275. In one embodiment, the network information can be transmitted to the base unit 250 from one or more remote sources, such as through wireless and/or wireline communication. The particular size and configuration of the group of communication devices 275 can vary. The network information can include various data that allows for the establishment of the network 280, including data corresponding to the Wired Equivalent Privacy (WEP) standard (e.g., stream cipher RC-4 information, CRC-32 checksum information, 40 bit key information and/or 24 bit initialization vector information) and/or data corresponding to the Wi-Fi Protected Access (WPA) standard (e.g., advanced encryption standard (AES) block cypher information, robust security network (RSN) information, and/or counter mode with cipher block chaining message authentication code protocol (CCMP) information). In one embodiment, some of the network information can be stored in a memory of the base unit 250, while other of this information is retrieved from one or more remote sources. In another embodiment, all of the network information can be stored in the memory of the base unit 250.

In step 404, the base unit 250 can populate the network set-up devices 350 with the network information or any portion thereof that is to be provided to the communication devices 275. As described above, the set-up devices 350 can be coupled to the base unit 250, such as through a USB port. In one embodiment, the obtaining of the network information by the base unit 250 in step 402 or the populating of the network set-up devices 350 in step 404 can be initiated by a user through depressing or otherwise triggering the actuator 340 of base unit 250. The actuator 340 can cause the base unit 250 to transmit a request to the one or more remote sources, such as the network proxy 222, for some or all of the network information.

In one embodiment, the base unit 250 can utilize an authorization process, such as requesting a password or the like from a user, to determine if the user has authorized access for establishing the network as in step 406. If the access is not authorized then in step 408 a notification of attempted unauthorized access can be provided, such as to a network administrator. If on the other hand, the access is authorized then the base unit 250 can populate or otherwise provide the network information to the network set-up devices 350, as described above with respect to step 404.

In step 410, the network set-up devices 350 can be removed (e.g., unplugging from a USB port) from the base unit 250 and then connected to each of the communication devices 275. As described above, the number of network set-up devices 350 can depend on a number of factors. For example, the base unit 250 can provide a larger number of network set-up devices 350 where establishing the network is intended to be done simultaneously by the communication devices 275 or where sharing of the devices 350 is not permitted. In step 412, the communication devices 275 can utilize the network information to access the network 280.

In step 414, the base unit 250 can monitor for and determine when a network set-up device 350 has moved outside of a particular range. The range or distance can be pre-set for the base unit 250 or can be adjusted, such as at the time of actuating the base unit to obtain the network information. The range or distance can be measured from the base unit and/or can be measured between each of the network set-up devices 350. As described above, the monitoring can be done in a number of different ways, including timing associated with a signal from a transmitter incorporated into the network set-up device 350. If the network set-up device 350 is no longer within an acceptable range then a notification can be provided as in step 416, such as to the other communication devices 275 and/or to a network administrator. The monitoring and notification described with respect to steps 414 and 416 can provide for security against theft of the network set-up devices 350, as well as to improve the quality of network service through maintaining a stronger signal strength by keeping the communication devices 275 and the base unit 250 within a particular distance of each other.

If on the other hand, the network set-up device 350 is within an acceptable range then in step 418, the base unit 250 can monitor for and determine when the network 280 is no longer to be maintained. If the network 280 is still being used or is still to be maintained then method 400 can return to step 412. If on the other hand, the network 280 is no longer to be maintained then method 400 can return to step 402 so that another network can be maintained. Each of the network set-up devices 350 can be connected to the base unit 250 for the establishment of the next network.

Upon reviewing the aforementioned embodiments, it would be evident to an artisan with ordinary skill in the art that said embodiments can be modified, reduced, or enhanced without departing from the scope and spirit of the claims described below. In one embodiment, the group of communication devices 275 can designate network administration privileges amongst the communication devices, such as the ability to allow others into the network 280 or to cancel the network. The hierarchy of the network 280 can be determined in a number of ways, such as based on the selection of the network set-up devices 350, where one or more of the devices are provided with network information implementing network administration privileges and the rest are not. In another embodiment, the type of network and its attributes can be selected by the users. For example, the base unit 250 can provide a selection of available service providers for the network 280. As another example, the base unit 250 can provide a selection of available modes of communication to be utilized by the communication devices 275, such as where some communication devices are WiMAX compatible and other communication devices are WiFi compatible. The present disclosure also contemplates the base unit 250 detecting compatibility amongst the group of communication devices and determining network attributes (e.g., a mode of communication) or a selection of such attributes based on the detection.

In another embodiment, the implementation of the network 280 can be virtual. For example, the connection of the network set-up device 350 with the communication device 275 can provide the access to the network 280 without the need for any execution or configuration by the user (e.g., plug and play). The present disclosure also contemplates the base unit 250 and one or more of the network set-up devices 350 being used for adding communication devices to an already existing network. For example, a business having a local area network operating in its building can utilize the base unit 250 and the network set-up devices 350 to incorporate other network compatible devices into the network, including printers, scanners, and so forth. As another example, garners using a local area network can add other co-located garners to their network through use of the base unit 250 and the network set-up devices 350.

These are but a few examples of modifications that can be applied to the present disclosure without departing from the scope of the claims. Accordingly, the reader is directed to the claims section for a fuller understanding of the breadth and scope of the present disclosure.

Figure 5:
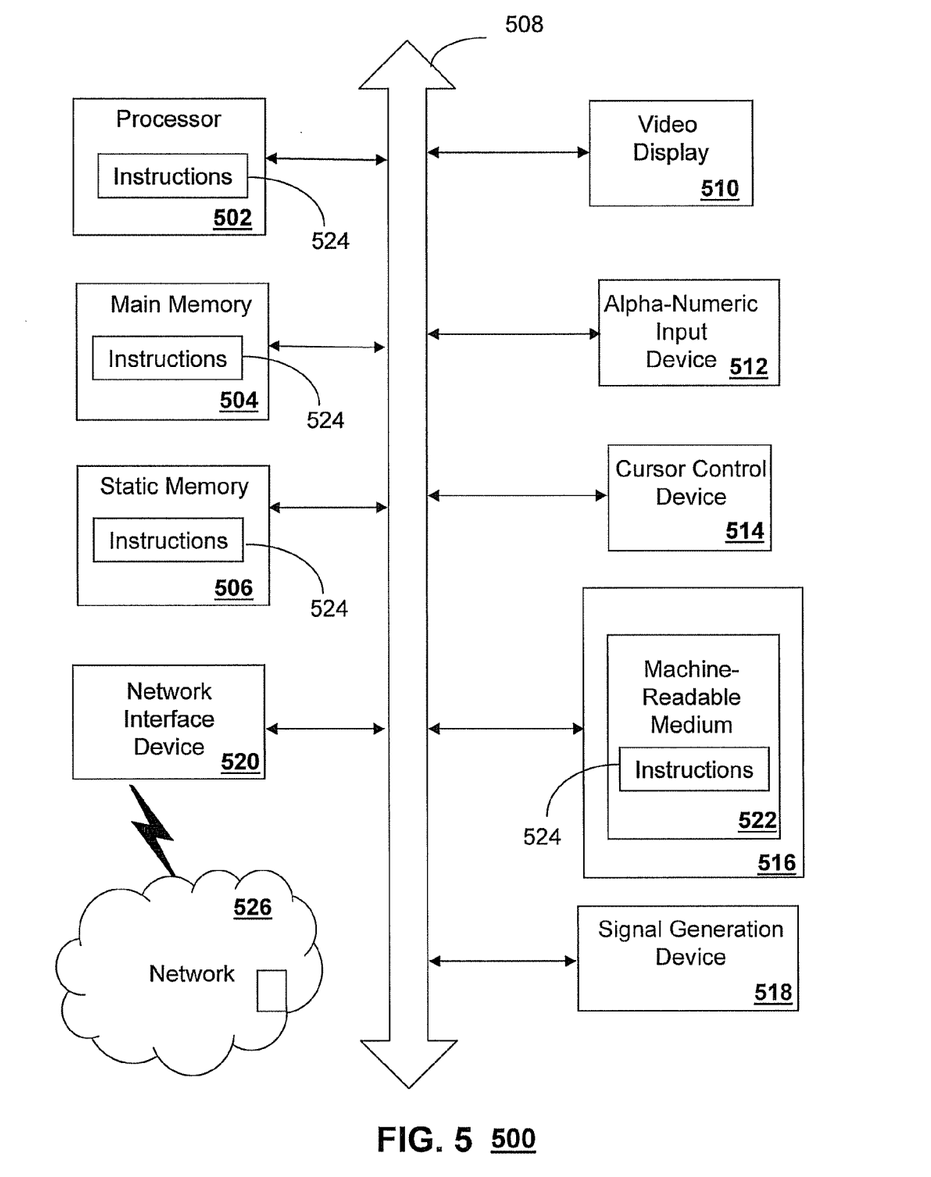
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor cause the processor to perform operations comprising:

obtaining network information associated with establishing a network among a group of communication devices;

storing the network information in a base unit;

providing the network information to a plurality of network set-up devices removably connected to the base unit, wherein the network information comprises network administration privileges to facilitate communication with the base unit, wherein each of the plurality of network set-up devices is connectable with a communication device of the group of communication devices to provide at least a portion of the network information to the communication device, and wherein the network is established based at least in part on the supplied portions of the network information;

monitoring a distance of each of the plurality of network set-up devices from the base unit according to a signal strength of a radio frequency signal;

determining that a network set-up device is out of a desired communication range of the base unit according to the monitored distance of each of the plurality of network set-up devices, wherein the desired communication range is based on a desired distance between the plurality of network set-up devices and the base unit, and wherein the desired distance maintains a desired quality of network service between the base unit and the communication devices; and asserting an alarm at the base unit to indicate that the network set-up device is out of range.

2. The non-transitory storage medium of claim 1, wherein the processor further performs operations comprising establishing the network as a sub-network of an already existing network.

3. The non-transitory storage medium of claim 1, wherein the processor further performs operations comprising retrieving a portion of the network information from a remote source.

4. The non-transitory storage medium of claim 1, wherein the radio frequency signal is emitted by each of the plurality of network set-up devices.

5. The non-transitory storage medium of claim 4, wherein the processor further performs operations comprising:
   determining the distance according to a radio frequency signals emitted by the plurality of network set-up devices; and
   providing a notification when the distance is greater than the desired distance.

6. A network element, comprising:
   a memory storing computer executable instructions;
   a controller coupled to the memory, wherein responsive to the controller executing the computer executable instructions, the controller performs operations comprising:
   obtaining network information associated with providing a communication device with access to a network;
   storing the network information;
   providing the network information to a network set-up device removably connected to the network element, wherein the network information comprises network administration privileges to facilitate communication with the base unit;
   monitoring a distance of the network set-up device from the network element according to a signal strength of a radio frequency signal, wherein the network set-up device is connectable with the communication device to provide at least a portion of the network information to the communication device, and wherein the access to the network is provided based at least in part on the supplied portions of the network information;
   determining that a network set-up device is out of a communication range of the network element according to the monitored distance of the network set-up device, wherein the communication range is based on a desired distance between the network set-up device and the network element, and wherein the desired distance maintains a desired quality of network service between the network element and the communication device; and
   asserting an alarm at the network element to indicate that the network set-up device is out of range.

7. The network element of claim 6, wherein the controller further performs operations comprising providing a notification when the distance is greater than a desired distance.

8. The network element of claim 6, wherein the obtaining comprises retrieving at least some of the network information from a remote source.

9. A network element, comprising:
   a memory storing computer instructions; and
   a controller coupled to the memory, wherein responsive to the controller executing the computer instructions, the controller performs operations comprising:
   obtaining network information associated with establishing a network among a group of communication devices;
   providing the network information to a plurality of network set-up devices when each of the plurality of network set-up devices is removably connected to the network element, wherein the network information comprises network administration privileges to facilitate communication with the network element, wherein each of the plurality of network set-up devices is connectable with a communication device of the group of communication devices to provide at least a portion of the network information to the communication device, and wherein the network is established based at least in part on the supplied portions of the network information;
   determining that a network set-up device is out of a communication range of the network element by monitoring a distance of each of the plurality of network set-up devices from the network element according to a signal strength of a radio frequency signal, wherein the communication range is based on a desired distance between the set-up devices and the network element, and wherein the desired distance maintains a desired quality of network service between the network element and the communication devices; and
   asserting an alarm at the network element to indicate that the network set-up device is out of range.

10. The network element of claim 9, wherein the controller further performs operations comprising storing at least some of the network information.

11. The network element of claim 9, wherein the obtaining comprises retrieving at least some of the network information from a remote source.

12. The network element of claim 9, wherein the controller further performs operations comprising monitoring the distance of each of the plurality of network set-up devices from the network element.

13. The network element of claim 12, wherein the controller further performs operations comprising notifying when the distance is greater than the desired distance.

14. A network element, comprising:
   a memory storing instructions and
   a controller coupled to the memory, wherein responsive to controller executing the instructions, the controller performs operations comprising:
   receiving network information from a base unit, the network information being associated with providing a communication device among a plurality of communication devices with access to a network, the network element being removably connected to the base unit when receiving the network information;
   storing the network information;
   providing at least a portion of the network information to the communication device, the network element being removably connected to the communication device when providing the portion of the network information; and
   transmitting a signal to the base unit, wherein the base unit uses the signal to monitor a distance of the network element to the base unit according to a signal strength of the signal, and wherein the access to the network is provided based at least in part on the supplied portion of the network information,
   wherein the base unit detects that the network element is out of a communication range of the base unit according to the monitored distance of the network element;
   wherein the base unit asserts an alarm at the base unit to indicate that the network element is out of range; and
   wherein the base unit generates additional network information based at least in part on the network information received from the base unit, wherein access to the network is provided based at least in part on the additional network information.

15. The network element of claim 14, wherein the controller further performs operations comprising providing a notification when the distance is greater than a desired distance.

16. The network element of claim 14, wherein the network information comprises network administration privileges.

17. The network element of claim 14, wherein the communication device is one of a group of communication devices, wherein the network is a sub-network of an already existing network, and wherein the sub-network is established at least in part using the network information.

18. A method, comprising:
receiving, by a network set-up device, network information from a base unit, the network information being associated with providing a communication device among a plurality of communication devices with access to a network, wherein the network information comprises network administration privileges to facilitate communication with the base unit, and wherein the network set-up device is connectable with the communication device;
storing, by the network set-up device, the network information in a network set-up device;
providing, by the network set-up device, at least a portion of the network information to the communication device by way of the network set-up device to establish communication between the communication device and the base unit;
monitoring, by the network set-up device, a distance between the network set-up device and the base unit according to a signal strength of a radio frequency signal;
detecting, by the network set-up device, that the network set-up device is out of a communication range of the base unit according to the monitored distance between the network set-up device and the base unit, wherein the communication range is based on a desired distance between the network set-up device and the base unit, and wherein the desired distance maintains a desired quality of network service between the base unit and the communication device; and
asserting, by the network set-up device, an alarm at the network set-up device to indicate that the network set-up device is out of range.

19. The method of claim 18, comprising providing a notification when the distance of the network set-up device removed from the base unit is greater than a desired distance from the base unit.

* * * * *